(12) United States Patent
Zhao et al.

(10) Patent No.: US 12,466,357 B2
(45) Date of Patent: Nov. 11, 2025

(54) WINDING DRUM ASSEMBLY

(71) Applicant: YANFENG INTERNATIONAL AUTOMOTIVE TECHNOLOGY CO., LTD., Shanghai (CN)

(72) Inventors: Wei Zhao, Shanghai (CN); Bin Chen, Shanghai (CN); Yongliang Huang, Shanghai (CN)

(73) Assignee: YANFENG INTERNATIONAL AUTOMOTIVE TECHNOLOGY CO., LTD., Shanghai (CN)

( * ) Notice: Subject to any disclaimer, the term of this patent is extended or adjusted under 35 U.S.C. 154(b) by 174 days.

(21) Appl. No.: 18/232,960

(22) Filed: Aug. 11, 2023

(65) Prior Publication Data

US 2024/0051496 A1 Feb. 15, 2024

(30) Foreign Application Priority Data

Aug. 12, 2022 (CN) .......................... 202210965237.8

(51) Int. Cl.
*B60R 22/34* (2006.01)
*B60R 22/02* (2006.01)
(Continued)

(52) U.S. Cl.
CPC .......... *B60R 22/4671* (2013.01); *B60R 22/02* (2013.01); *B60R 22/36* (2013.01)

(58) Field of Classification Search
CPC ......... B60R 22/34; B60R 22/36; B60R 22/46; B60R 22/3413; B60R 22/4671; B60R 2022/287; B60R 2022/4647
See application file for complete search history.

(56) References Cited

U.S. PATENT DOCUMENTS 6,616,081 B1 * 9/2003 Clute .................... C23C 16/279
280/805
8,727,257 B2 * 5/2014 Dahlquist ........... B60R 22/3413
280/806
(Continued)

FOREIGN PATENT DOCUMENTS

| WO | 2017174642 A1 | 10/2017 |
| WO | 2020231115 A1 | 11/2020 |
| WO | 2021230046 A1 | 11/2021 |

OTHER PUBLICATIONS

Extended European Search Report from the European Patent Office for EP Application No. 23190946 dated Dec. 20, 2023, 7 pages.

*Primary Examiner* — Sang K Kim
(74) *Attorney, Agent, or Firm* — WARNER NORCROSS + JUDD LLP

(57) ABSTRACT

A winding drum used for winding a safety belt extends in the axial direction and is rotatably supported in a frame of a retractor. A gear mechanism is installed at one side of the winding drum through a force limiting mechanism and comprises a stop wheel and a ball gear which are riveted and fixedly connected in the axial direction. The stop wheel is rotatably installed on the frame, and the ball gear comprises a penetrating shaft hole. The force limiting mechanism is inserted into the shaft hole in the axial direction and both ends of the force limiting mechanism are respectively connected with the winding drum and the gear mechanism to prevent passengers from being excessively restrained by realizing the force limiting function. The gear mechanism and the force limiting mechanism are directly assembled to the winding drum, with simple steps and few independent components.

14 Claims, 2 Drawing Sheets

(51) Int. Cl.
*B60R 22/36* (2006.01)
*B60R 22/46* (2006.01)

(56) References Cited

U.S. PATENT DOCUMENTS

| | | | |
|---|---|---|---|
| 2006/0022447 A1* | 2/2006 | Kohlndorfer | B60R 22/3413 280/805 |
| 2011/0000996 A1* | 1/2011 | Wigstrom | B60R 22/3413 242/376 |
| 2012/0104137 A1* | 5/2012 | Axblom | B60R 22/3413 242/379.1 |
| 2019/0054894 A1 | 2/2019 | Daeuber et al. | |
| 2019/0299923 A1* | 10/2019 | Yanagawa | B60R 22/34 |
| 2020/0231115 A1 | 7/2020 | Tanaka et al. | |
| 2020/0324732 A1* | 10/2020 | Yanagawa | B60R 22/4633 |
| 2020/0324733 A1* | 10/2020 | Yanagawa | B60R 22/4633 |
| 2021/0276510 A1* | 9/2021 | Axblom | B60R 22/3413 |
| 2022/0210749 A1 | 6/2022 | Jang et al. | |
| 2023/0192028 A1 | 6/2023 | Uchibori et al. | |
| 2023/0331186 A1* | 10/2023 | Uchibori | B60R 22/46 |

* cited by examiner

WINDING DRUM ASSEMBLY

CROSS-REFERENCE TO RELATED APPLICATIONS

This application is claims priority to and all advantages of Chinese Patent Application No. 202210965237.8 filed on Aug. 12, 2022, the contents of which are incorporated herein by reference.

FIELD

The present disclosure relates to vehicle safety, and more particularly, to a winding drum assembly.

BACKGROUND

Safety belt device is an important part of vehicle passenger restraint system, which can provide protection for passengers especially in traffic accidents to avoid or minimize injuries to the passengers.

The safety belt device includes a retractor, and its winding drum assembly can sense the state of the vehicle, such as the acceleration and/or the inclination angle of the vehicle, restrict the safety belt from being pulled out under a predetermined condition, and retract the safety belt in an activated state to ensure the safety of the passengers.

The existing winding drum assembly usually has more parts and larger size, which makes the overall package of the retractor too large.

SUMMARY

In order to solve the problems that the winding drum assembly in the prior art generally has more parts and larger size, the present disclosure provides a winding drum assembly.

The winding drum assembly according to the present disclosure comprises a winding drum, a gear mechanism and a force limiting mechanism, wherein the winding drum for winding a safety belt extends in the axial direction and is rotatably supported in a frame of a retractor, the gear mechanism is installed at one side of the winding drum through the force limiting mechanism and comprises a stop wheel and a ball gear which are riveted and fixedly connected in the axial direction, the stop wheel for locking the winding drum to rotate in the direction of pulling out the safety belt to limit the safety belt from being pulled out under a predetermined condition is rotatably installed on the frame, and the ball gear for driving the winding drum to rotate in the direction of retracting the safety belt to retract the safety belt to restrain passengers in an activated state comprises a penetrating shaft hole, and the force limiting mechanism is inserted into the shaft hole in the axial direction and both ends of the force limiting mechanism are respectively connected with the winding drum and the gear mechanism to prevent the passengers from being excessively restrained by realizing the force limiting function.

Preferably, the stop wheel comprises a chassis and a plurality of bumps formed integrally, the chassis is a flat disk structure, and the bumps distributed discretely with each other respectively protrude axially adjacent to the peripheral edge of the chassis and define at least two notches; the ball gear comprises at least two tabs, and each tab is inserted into the notch defined by adjacent bumps to be riveted and fixedly connected so as to realize a torsion-resistant assembly of the stop wheel and the ball gear.

Preferably, the ball gear comprises a sinker and a periphery integrally formed with the tabs, wherein the sinker is formed by sinking the surface of the ball gear facing the stop wheel, and the periphery extends around the peripheral edge of the sinker, and the tabs distributed discretely with each other respectively extend from the periphery toward the stop wheel in the axial direction, and the chassis of the stop wheel is inserted into the sinker of the ball gear and is surrounded by the periphery.

Preferably, the chassis of the stop wheel comprises a smooth transition wave profile to define a flower shape, and the radially inner side of the periphery of the ball gear correspondingly comprises a complementary wave profile to adapt to the flower shape to assist the torsion-resistant assembly of the stop wheel and the ball gear.

Preferably, the winding drum assembly further comprises a locking mechanism assembled on the stop wheel, and the locking mechanism comprises a locking pawl, and the winding drum is locked on the frame of the retractor through the locking pawl.

Preferably, after the chassis of the stop wheel is inserted into the sinker of the ball gear, the outer surface of the chassis and the outer surface of the periphery are flush to facilitate the installation of the locking mechanism.

Preferably, a locking plate is fixed on the frame, and the locking mechanism further comprises a return spring, the locking pawl is kept disengaged from the locking plate under the action of the spring force of the return spring and is engaged with the locking plate under the condition of overcoming the spring force of the return spring to realize the locking function.

Preferably, the end of the bump of the stop wheel extends radially outward from the chassis to press on the periphery of the ball gear to assist in axial limiting of the stop wheel and the ball gear.

Preferably, the axial length of the chassis accounts for $1/10$-$1/6$ of the overall axial length of the stop wheel.

Preferably, the ball gear comprises a first half portion and a second half portion which are fixedly connected, one end of the first half portion is fixedly connected to the stop wheel, the other end of the first half portion is inserted into the winding drum for installation, and the second half portion is sleeved and fixed on the first half portion outside the winding drum.

Preferably, the shaft hole of the ball gear is provided by the first half portion, and the axial end of the shaft hole adjacent to the stop wheel is formed as a spline hole for the force limiting mechanism to be installed in a torsion-resistant manner.

Preferably, the force limiting mechanism comprises a first force limiting lever, a second force limiting lever and a force limiting lever sleeve which are fixedly connected, wherein the first force limiting lever and the second force limiting lever are respectively inserted into the force limiting lever sleeve and fixedly connected with each other through splines thereof to form a compact force limiting mechanism to transmit torque.

Preferably, the axial length of the overlap between the winding drum and the gear mechanism accounts for $1/4$-$1/2$ of the overall axial length of the ball gear.

Preferably, the axial length of the overlap between the gear mechanism and the force limiting mechanism accounts for $1/6$-$1/3$ of the overall axial length of the force limiting mechanism.

According to the winding drum assembly of the present disclosure, the stop wheel and the ball gear form an integral gear mechanism, and the first force limiting lever, the second force limiting lever and the force limiting lever sleeve are fixedly connected to form an integral force limiting mechanism. These two mechanisms are directly assembled to the winding drum, with simple steps and few independent components. In addition, the force limiting mechanism is inserted into the shaft hole of the ball gear in the axial direction to make the force limiting mechanism and the gear mechanism overlap in a larger part in the axial direction, so that the size of the whole winding drum assembly can be smaller.

DETAILED DESCRIPTION OF EMBODIMENTS

Preferred embodiments of the present disclosure will be given and described in detail with reference to the attached drawings.

Figure 1:
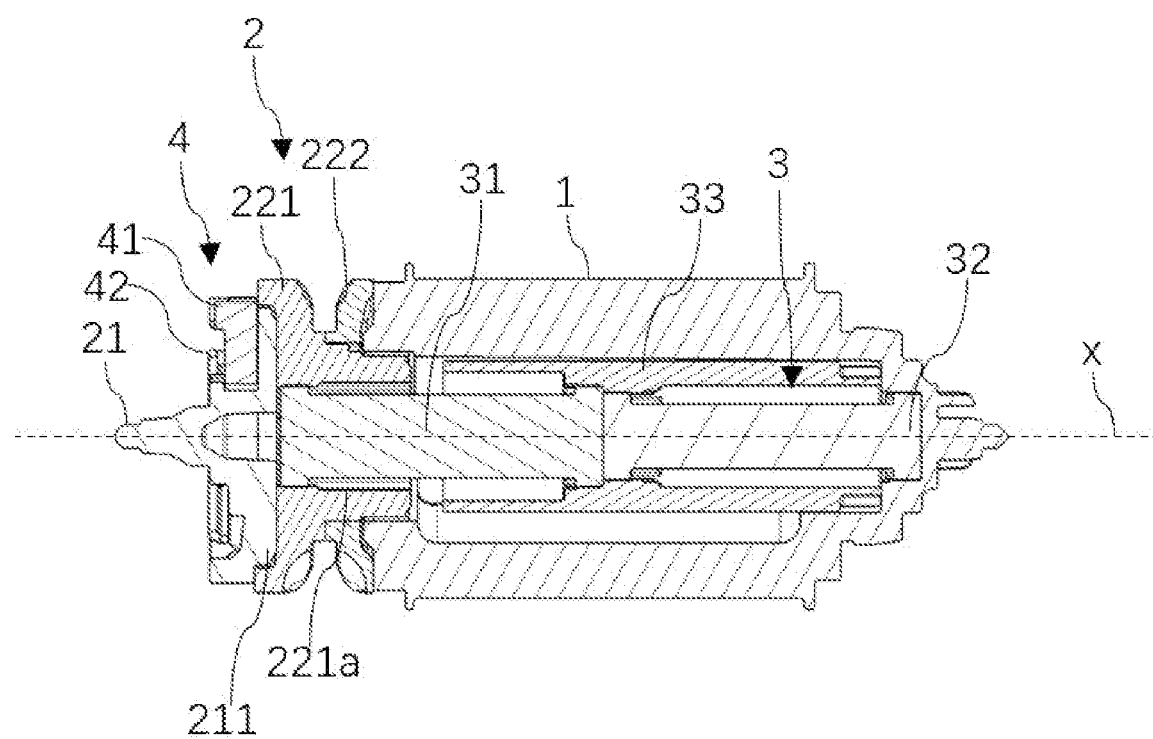
FIG. 1 is an overall cross-sectional view of a winding drum assembly according to a preferred embodiment of the present disclosure.

As shown in FIG. 1, a winding drum assembly according to a preferred embodiment of the present disclosure comprises a winding drum 1, a gear mechanism 2 and a force limiting mechanism 3, wherein the winding drum 1 for winding a safety belt extends in the axial direction X and is rotatably supported in a frame (not shown) of a retractor. The gear mechanism 2 is installed on one side of the winding drum 1 through the force limiting mechanism 3 to limit the safety belt from being pulled out under a predetermined condition and to retract the safety belt in an activated state to restrain the passengers. The force limiting mechanism 3 extends in the axial direction X and is installed inside the winding drum 1, and its two ends are respectively connected with the winding drum 1 and the gear mechanism 2 to avoid the passengers from being excessively restrained by realizing the force limiting function. In addition, the winding drum assembly according to this embodiment further includes a locking mechanism 4 assembled on the gear mechanism 2, which includes a locking pawl 41 and a return spring 42, wherein the winding drum 1 can be locked on the frame of the retractor through the locking pawl 41. Specifically, a locking plate is fixed on the frame, and the locking pawl 41 is kept disengaged from the locking plate under the action of the spring force of the return spring 42 and is engaged with the locking plate under the condition of overcoming the spring force of the return spring 42 to realize the locking function.

The structure of the gear mechanism 2 will be described below.

Figure 2:
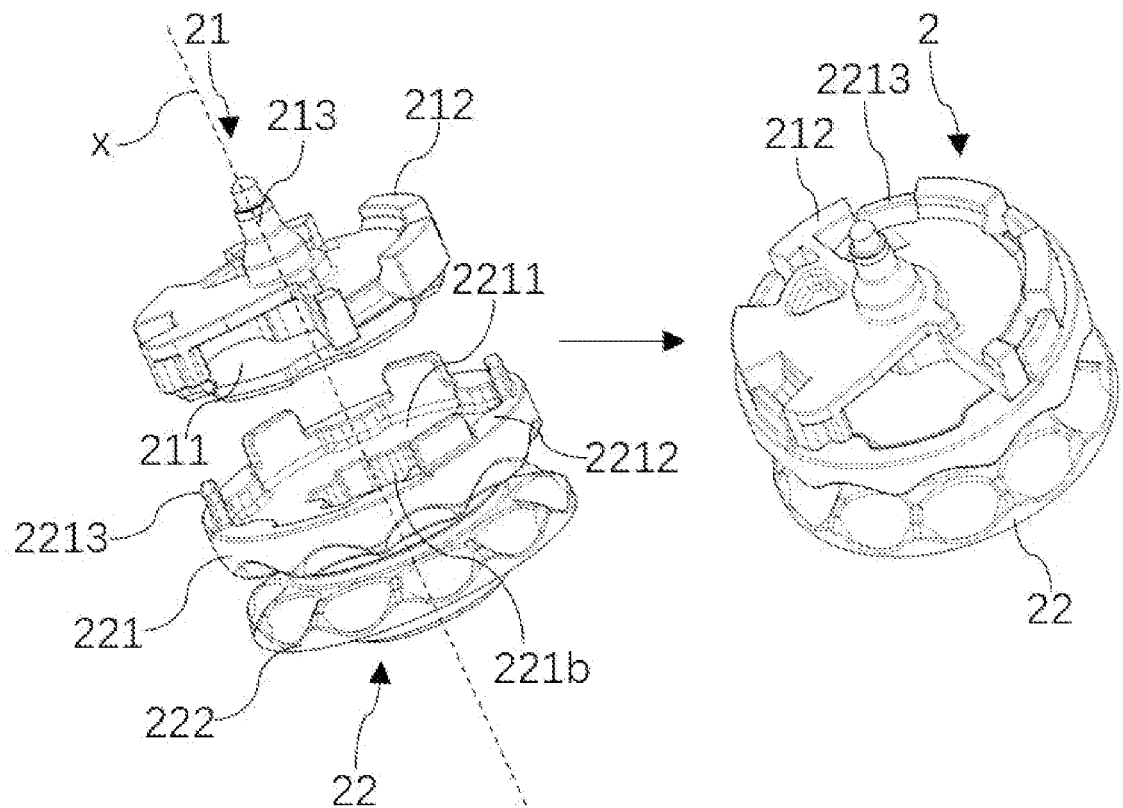
FIG. 2 is an assembly schematic view of a gear mechanism of the winding drum assembly of FIG. 1.

As shown in FIG. 2, the gear mechanism 2 includes a stop wheel 21 and a ball gear 22 installed along the axial direction X, wherein the locking mechanism 4 (see FIG. 1) is assembled on the stop wheel 21. The stop wheel 21 is used for locking the winding drum 1 to rotate in the direction of pulling out the safety belt to limit the safety belt from being pulled out under a predetermined situation, and the ball gear 22 is used for driving the winding drum 1 to rotate in the direction of retracting the safety belt to retract the safety belt to restrain the passengers in an activated state. The stop wheel 21 and the ball gear 22 are fixedly connected by riveting to form a whole.

As shown in FIG. 2, the stop wheel 21 has a chassis 211, bumps 212 and an axle neck 213 formed integrally, wherein the chassis 211 is a flat disk structure, and six bumps 212 distributed discretely with each other respectively protrude in the axial direction X adjacent to the peripheral edge of the chassis 211 and define five notches, and the axle neck 213 protrudes in the axial direction from the center of the chassis 211 to support the stop wheel 21 on the frame of the retractor. In the preferred embodiment, the axial length of the chassis 211 only accounts for $\frac{1}{10}$-$\frac{1}{6}$ of the overall axial length of the stop wheel 21.

As shown in FIG. 2, the ball gear 22 includes a first half portion 221 and a second half portion 222 which are fixedly connected. Combining with FIG. 1, one end of the first half portion 221 is fixedly connected to the stop wheel 21, the other end of the first half portion 221 is inserted into the winding drum 1 for installation, and the second half portion 222 is sleeved and fixed on the first half portion 221 outside the winding drum 1. By inserting the first half portion 221 into the winding drum 1 and rotatably mounting it, the winding drum 1 and the gear mechanism 2 are at least partially overlapped in the axial direction X, so that the overall axial size of the winding drum assembly of this embodiment can be made smaller. In addition, the first half portion 221 has a penetrating shaft hole 221*a*, and the axial end of the shaft hole 221*a* adjacent to the stop wheel 21 is formed as a spline hole 221*b* (see FIG. 2) for the force limiting mechanism 3 to be installed in a torsion-resistant manner. By arranging the spline hole 221*b* at the axial end of the first half portion 221 near the stop wheel 21, the gear mechanism 2 and the force limiting mechanism 3 have an overlap in a larger part in the axial direction X, so that the overall axial size of the winding drum assembly of this embodiment can be smaller.

As shown in FIG. 2, the first half portion 221 has a sinker 2211, a periphery 2212 tabs 2213 formed integrally, wherein the sinker 2211 is formed by sinking the surface of the first half portion 221 facing the stop wheel 21, and the periphery 2212 extends around the peripheral edge of the sinker 2211, and five tabs 2213 distributed discretely with each other respectively extend from the periphery 2212 toward the stop wheel 2213 along the axial direction X. The winding drum assembly according to this embodiment further includes a steel ball launching device which can launch a plurality of steel balls when activated, and the steel balls can drive the ball gear 22 in the direction of retracting the safety belt, thereby driving the stop wheel 21 and then driving the winding drum 1 to rotate in the direction of retracting the safety belt. Therefore, other specific structures of the ball gear 22 are constructed in coordination with the steel ball launching device, which will not be described here.

Next, the installation of the stop wheel 21 and the ball gear 22 in the axial direction X will be described in detail.

The five tabs 2213 of the first half portion 221 are inserted into the five notches defined by the adjacent bumps 212 of the stop wheel 21 to be riveted and fixedly connected to realize the torsion-resistant assembly of the stop wheel 21 and the ball gear 22. It should be understood that the number of the tabs 2213 here is only an example and not a limitation.

The chassis 211 of the stop wheel 21 is inserted into the sinker 2211 of the first half portion 221 to be installed and surrounded by the periphery 2212 of the first half portion 221. In fact, the chassis 211 of the stop wheel 21 has a smooth transition wave profile to define a flower shape, and the radially inner side of the periphery 2212 of the first half portion 221 correspondingly has a complementary wave profile to adapt to the flower shape to assist the torsion-resistant assembly of the stop wheel 21 and the ball gear 22.

After the chassis 211 of the stop wheel 21 is inserted into the sinker 2211 of the first half portion 221, the outer surface of the chassis 211 is flush with the outer surface of the periphery 2212, so as to facilitate the installation of the locking mechanism 4 (see FIG. 1).

The end of the bump 212 of the stop wheel 21 extends radially outward from the chassis 211 to press on the periphery 2212 of the first half portion 221 to assist in axial limiting of the stop wheel 21 and the ball gear 22.

The structure of the force limiting mechanism 3 will be described below.

Figure 3:
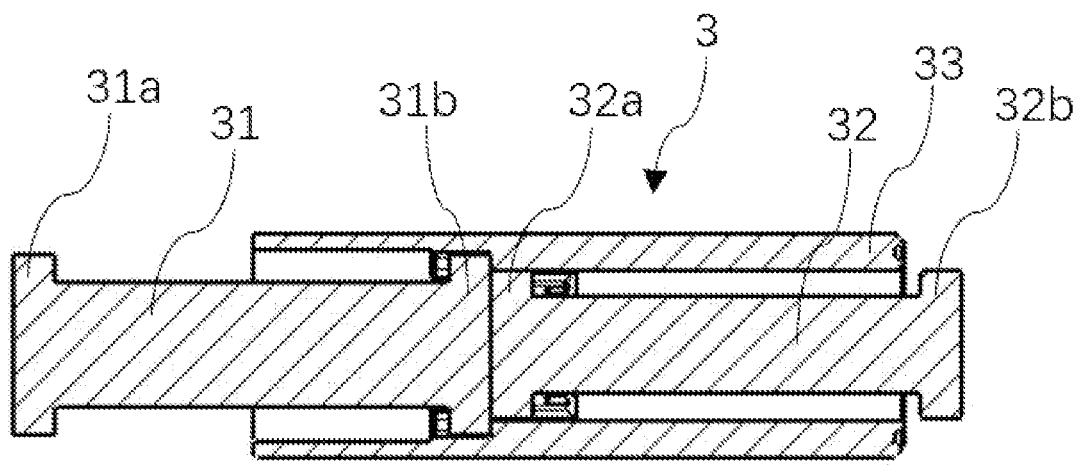
FIG. 3 is a cross-sectional view of a force limiting mechanism of the winding drum assembly of FIG. 1.

As shown in FIG. 3, the force limiting mechanism 3 includes a first force limiting lever 31, a second force limiting lever 32 and a force limiting lever sleeve 33 which are fixedly connected, wherein the first force limiting lever 31 and the second force limiting lever 32 are respectively inserted into the force limiting lever sleeve 33 and are fixedly connected with each other through splines thereof, thus forming a compact force limiting mechanism 3 to transmit torque.

In this embodiment, the force limiting mechanism 3 adopts the manner of connecting two torsion levers, which can realize multi-stage force limiting. The torsion levers here can be plastically deformed when the predetermined torsion load is exceeded, thereby limiting the torque transmitted between the winding drum 1 and the gear mechanism 2 through the torsion levers, and stabilizing the restraining force on the passengers at a set force value. Here, the multi-stage force limiting can realize gradation of the restraining force value by switching, so as to minimize the damage caused by the safety belt to the passengers according to their different body types.

It should be understood that the force limiting mechanism 3 here is only an example and not a limitation.

Specifically, the first force limiting lever 31 and the second force limiting lever 32 are both metal torsion levers with splines at both ends, and splines of two sizes are correspondingly arranged in the force limiting lever sleeve 33. One end 31*a* of the first force limiting lever 31 is inserted into the spline hole 221*b* (see FIG. 2) of the first half portion 221 of the ball gear 22 to be fixedly connected, and the other end 31*b* of the first force limiting lever 31 is fixedly connected with the large spline of the force limiting lever sleeve 33. One end 32*a* of the second force limiting lever 32 is fixedly connected with the small spline of the force limiting lever sleeve 33, and the other end 32*b* of the second force limiting lever 32 is fixedly connected with the winding drum 1.

In this way, the winding drum 1 and the gear mechanism 2 of the present disclosure partially overlap in the axial direction, and the gear mechanism 2 and the force limiting mechanism 3 partially overlap in the axial direction to form a compact structure. In the preferred embodiment, the axial length of the overlap between the winding drum 1 and the gear mechanism 2 accounts for ¼-½ of the overall axial length of the ball gear 22; the axial length of the overlap between the gear mechanism 2 and the force limiting mechanism 3 accounts for ⅙-⅓ of the overall axial length of the force limiting mechanism 3.

The stop wheel 21 and the ball gear 22 of the winding drum assembly of the present disclosure are fixedly connected to form an integral gear mechanism 2, and the first force limiting lever 31, the second force limiting lever 32 and the force limiting lever sleeve 33 are fixedly connected to form an integral force limiting mechanism 3. These two mechanisms are directly assembled to the winding drum 1, so that the winding drum assembly of the present disclosure has a very compact and stable structure and few independent components. In a word, compared with the prior art, the winding drum assembly of the present disclosure has a more compact, simple and stable structure, and can make the overall size smaller on the premise of meeting the functions.

What have been described above are only the preferred embodiments of the present disclosure, and would not be used to limit the scope of the present disclosure. Various changes can be made to the above-mentioned embodiments of the present disclosure. That is to say, all simple and equivalent changes and modifications made according to the claims and specification of the present application fall within the scope of protection of the claims of the present patent. What is not described in detail in the present disclosure is conventional technical content.

The invention claimed is:

1. A winding drum assembly, wherein the winding drum assembly comprises a winding drum, a gear mechanism and a force limiting mechanism, and wherein the winding drum for winding a safety belt extends in the axial direction and is rotatably supported in a frame of a retractor, and the gear mechanism is installed at one side of the winding drum through the force limiting mechanism and comprises a stop wheel and a ball gear which are riveted and fixedly connected in the axial direction, the stop wheel for locking the winding drum to rotate in the direction of pulling out the safety belt to limit the safety belt from being pulled out under a predetermined condition is rotatably installed on the frame, and the ball gear for driving the winding drum to rotate in the direction of retracting the safety belt to retract the safety belt to restrain passengers in an activated state comprises a penetrating shaft hole, and the force limiting mechanism is inserted into the shaft hole in the axial direction and both ends of the force limiting mechanism are respectively connected with the winding drum and the gear mechanism to prevent the passengers from being excessively restrained by realizing the force limiting function.

2. The winding drum assembly according to claim 1, wherein the stop wheel comprises a chassis and a plurality of bumps formed integrally, the chassis is a flat disk structure, and the bumps distributed discretely with each other respectively protrude axially adjacent to the peripheral edge of the chassis and define at least two notches; the ball gear comprises at least two tabs, and each tab is inserted into the notch defined by adjacent bumps to be riveted and fixedly connected so as to realize a torsion-resistant assembly of the stop wheel and the ball gear.

3. The winding drum assembly according to claim 2, wherein the ball gear comprises a sinker and a periphery integrally formed with the tabs, and wherein the sinker is formed by sinking the surface of the ball gear facing the stop wheel, and the periphery extends around the peripheral edge of the sinker, and the tabs distributed discretely with each other respectively extend from the periphery toward the stop wheel in the axial direction, and the chassis of the stop wheel is inserted into the sinker of the ball gear and is surrounded by the periphery.

4. The winding drum assembly according to claim 3, wherein the chassis of the stop wheel comprises a smooth transition wave profile to define a flower shape, and the radially inner side of the periphery of the ball gear correspondingly comprises a complementary wave profile to adapt to the flower shape to assist the torsion-resistant assembly of the stop wheel and the ball gear.

5. The winding drum assembly according to claim 3, wherein the winding drum assembly further comprises a locking mechanism assembled on the stop wheel, and the locking mechanism comprises a locking pawl, and the winding drum is locked on the frame of the retractor through the locking pawl.

6. The winding drum assembly according to claim 5, wherein after the chassis of the stop wheel is inserted into the sinker of the ball gear, the outer surface of the chassis and the outer surface of the periphery are flush to facilitate the installation of the locking mechanism.

7. The winding drum assembly according to claim 5, wherein a locking plate is fixed on the frame, and the locking mechanism further comprises a return spring, the locking pawl is kept disengaged from the locking plate under the action of the spring force of the return spring and is engaged with the locking plate under the condition of overcoming the spring force of the return spring to realize the locking function.

8. The winding drum assembly according to claim 3, wherein the end of the bump of the stop wheel extends radially outward from the chassis to press on the periphery of the ball gear to assist in axial limiting of the stop wheel and the ball gear.

9. The winding drum assembly according to claim 2, wherein the axial length of the chassis accounts for $1/10$-$1/6$ of the overall axial length of the stop wheel.

10. The winding drum assembly according to claim 1, wherein the ball gear comprises a first half portion and a second half portion which are fixedly connected, one end of the first half portion is fixedly connected to the stop wheel, the other end of the first half portion is inserted into the winding drum for installation, and the second half portion is sleeved and fixed on the first half portion outside the winding drum.

11. The winding drum assembly according to claim 10, wherein the shaft hole of the ball gear is provided by the first half portion, and the axial end of the shaft hole adjacent to the stop wheel is formed as a splined hole for the force limiting mechanism to be installed in a torsion-resistant manner.

12. The winding drum assembly according to claim 1, wherein the force limiting mechanism comprises a first force limiting lever, a second force limiting lever and a force limiting lever sleeve which are fixedly connected, and wherein the first force limiting lever and the second force limiting lever are respectively inserted into the force limiting lever sleeve and fixedly connected with each other through splines thereof to form a compact force limiting mechanism to transmit torque.

13. The winding drum assembly according to claim 1, wherein the axial length of the overlap between the winding drum and the gear mechanism accounts for $1/4$-$1/2$ of the overall axial length of the ball gear.

14. The winding drum assembly according to claim 1, wherein the axial length of the overlap between the gear mechanism and the force limiting mechanism accounts for $1/6$-$1/3$ of the overall axial length of the force limiting mechanism.

\* \* \* \* \*